(12) United States Patent
Wen et al.

(10) Patent No.: US 8,984,566 B2
(45) Date of Patent: Mar. 17, 2015

(54) VIDEO ENTERTAINMENT SYSTEM (71) Applicants: Michael Tai-Hao Wen, Taipei (TW); Chien-Hua Lai, Taipei (TW)

(72) Inventors: Michael Tai-Hao Wen, Taipei (TW); Chien-Hua Lai, Taipei (TW)

(73) Assignee: Jet Optoelectronics Co., Ltd., Taipei (TW)

( * ) Notice: Subject to any disclaimer, the term of this patent is extended or adjusted under 35 U.S.C. 154(b) by 36 days.

(21) Appl. No.: 13/736,023

(22) Filed: Jan. 7, 2013

(65) Prior Publication Data

US 2014/0196098 A1   Jul. 10, 2014

(51) Int. Cl.
- H04N 7/18    (2006.01)
- H04N 21/61   (2011.01)
- H04N 21/414  (2011.01)
- H04N 21/443  (2011.01)

(52) U.S. Cl.
CPC ......... H04N 21/61 (2013.01); H04N 21/41422 (2013.01); H04N 21/4436 (2013.01)
USPC .................................. 725/75; 725/74; 725/81

(58) Field of Classification Search
None
See application file for complete search history.

(56) References Cited

U.S. PATENT DOCUMENTS

| | | | |
|---|---|---|---|
| 5,555,466 A * | 9/1996 | Scribner et al. | 725/75 |
| 6,792,323 B2 * | 9/2004 | Krzyzanowski et al. | 700/90 |
| 7,526,367 B2 | 4/2009 | Schofield | |
| 8,154,381 B2 * | 4/2012 | Kohanek | 340/3.71 |
| 8,291,456 B2 * | 10/2012 | Emoto et al. | 725/75 |
| 2004/0154040 A1 * | 8/2004 | Ellis | 725/58 |
| 2005/0008333 A1 * | 1/2005 | Yuen et al. | 386/83 |
| 2005/0015805 A1 * | 1/2005 | Iwamura | 725/79 |
| 2005/0102697 A1 * | 5/2005 | Vitito | 725/75 |
| 2006/0288379 A1 * | 12/2006 | Vitito | 725/77 |
| 2008/0022304 A1 * | 1/2008 | Prus et al. | 725/39 |
| 2008/0250462 A1 * | 10/2008 | Crohas | 725/74 |
| 2008/0252798 A1 | 10/2008 | Vitito | |
| 2009/0138920 A1 * | 5/2009 | Anandpura | 725/76 |
| 2010/0005496 A1 * | 1/2010 | Ellis et al. | 725/87 |
| 2010/0304349 A1 | 12/2010 | Kunin | |
| 2010/0319038 A1 * | 12/2010 | Devassykutty et al. | 725/82 |
| 2011/0106375 A1 | 5/2011 | Gurusamy Sundaram et al. | |
| 2012/0086247 A1 | 4/2012 | Liu | |
| 2012/0233644 A1 | 9/2012 | Rao | |
| 2013/0016209 A1 | 1/2013 | Taylor | |
| 2013/0151111 A1 | 6/2013 | Skelton | |
| 2013/0157647 A1 | 6/2013 | Kolodziej | |
| 2013/0200991 A1 | 8/2013 | Ricci | |
| 2013/0226369 A1 | 8/2013 | Yorio | |

\* cited by examiner

*Primary Examiner* — Jason K Lin
(74) *Attorney, Agent, or Firm* — Gokalp Bayramoglu (57) ABSTRACT

An entertainment system including one or more display devices. Each display device may have a media player to play the content of a disc or media inserted in the media player. Each display device may also have a storage unit to store the media content. The media content can be shared between different display devices. The connection between display devices can be either by plurality of cables or by a wireless network. Each display device receives its power from a power filter. The power filter is connected to a power source.

13 Claims, 8 Drawing Sheets

VIDEO ENTERTAINMENT SYSTEM

BACKGROUND

A typical current car entertainment system comprises different elements such as display devices, wherein these display devices may be installed in the seat headrests of a vehicle. Display devices may be connected a central control box. The control box distributes audio and video signals between different display devices.

The additional central control box increases the system complexity. Therefore there is a need for a system that does not have a central control box and yet enables users to be able to share video and audio signals between display units.

SUMMARY OF THE INVENTION

The invention is a vehicle entertainment system with one or more display devices. Each display device may have a media player to play the content of a disc or media inserted in the media player. The content's audio or video can be shared between different display devices. The connection between display devices can be either by plurality of cables or by a wireless network. Each display device receives its power from a power filter. The power filter is connected to the vehicle power.

DETAILED DESCRIPTION OF THE INVENTION

Figure 1:
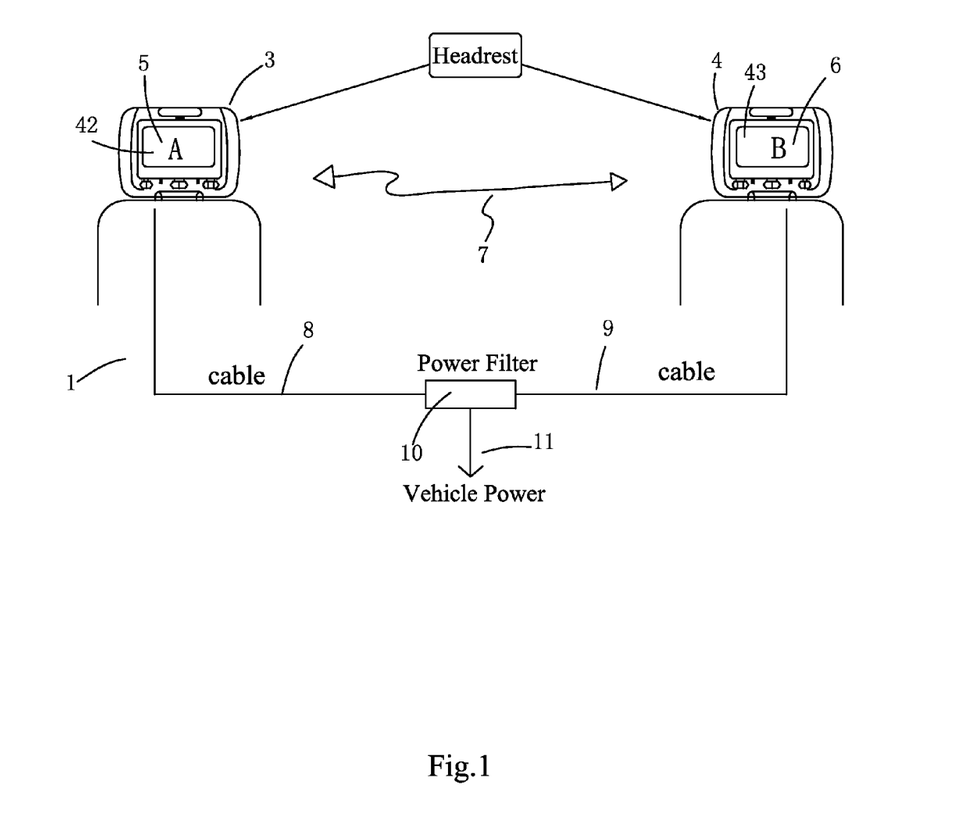
FIG. 1 shows the system configuration with two display devices, the wireless connection and the power filter

An embodiment of the invention is shown in FIG. 1. The system 1 in FIG. 1 comprises first display device 5 and second display device 6; first headrest 3 and second headrest 4; power cables 8, 9 and 11; power filter 10, and communication link 7. Communication link 7 is a wireless link and can be a radio frequency network such as WIFI or a propriety wireless network.

System 1 may have a single headrest or multiple headrests. System 1 may have a single first display device 5 or multiple display devices namely, first display device 5 and second display device 6. Two display devices namely first display device 5 and second display device 6 shown in this embodiment. However there is no limit as to how many display devices can be used in system 1. First display device 5 is mounted in first headrest 3. Second display device 6 is mounted in second headrest 4. Different mounting techniques can be used to mount first display device 5 into first headrest 3. Likewise different mounting techniques can be used to mount second display device 6 into second headrest 4. Power filter 10 is connected to vehicle power via cable 11. The vehicle power that applied to power filter 10 is filtered and sent to first display device 5 via cable 8 and to second display device 6 via cable 9.

Figure 2:
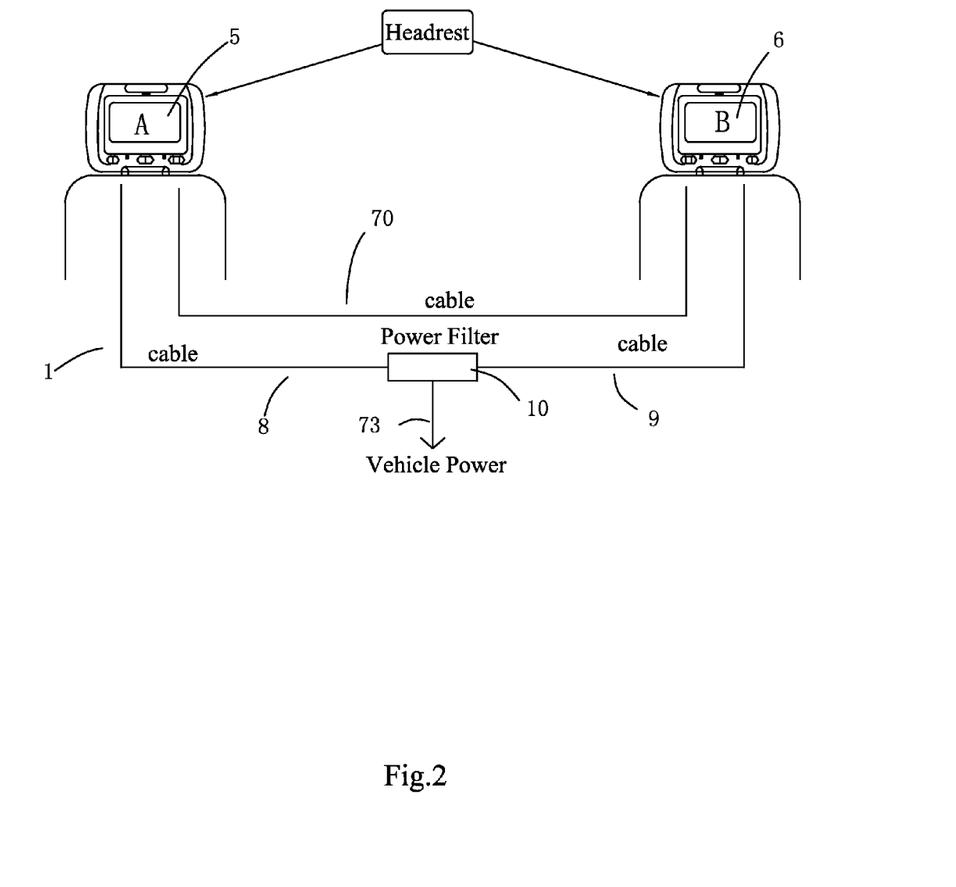
FIG. 2 shows the system configuration with two display devices, their wired connection to each other and the power filter

FIG. 2 shows another embodiment of the invention. System 1 in FIG. 1 comprises first display device 5 and second display device 6; power cables 8, 9 and 73; power filter 10, and cable 70. Cable 70 carries audio and video signals between first display device 5 and second display device 6.

System 1 may have a single headrest or multiple headrests. System 1 may have a single first display device 5 or multiple display devices namely, first display device 5 and second display device 6. Two display devices namely first display device 5 and second display device 6 shown in this embodiment. However there is no limit as to how many display devices can be used in system 1. Power filter 10 is connected to vehicle power via cable 73. The vehicle power that is connected to power filter 10 is filtered and sent to first display device 5 via cable 8 and to second display device 6 via cable 9.

Figure 3:
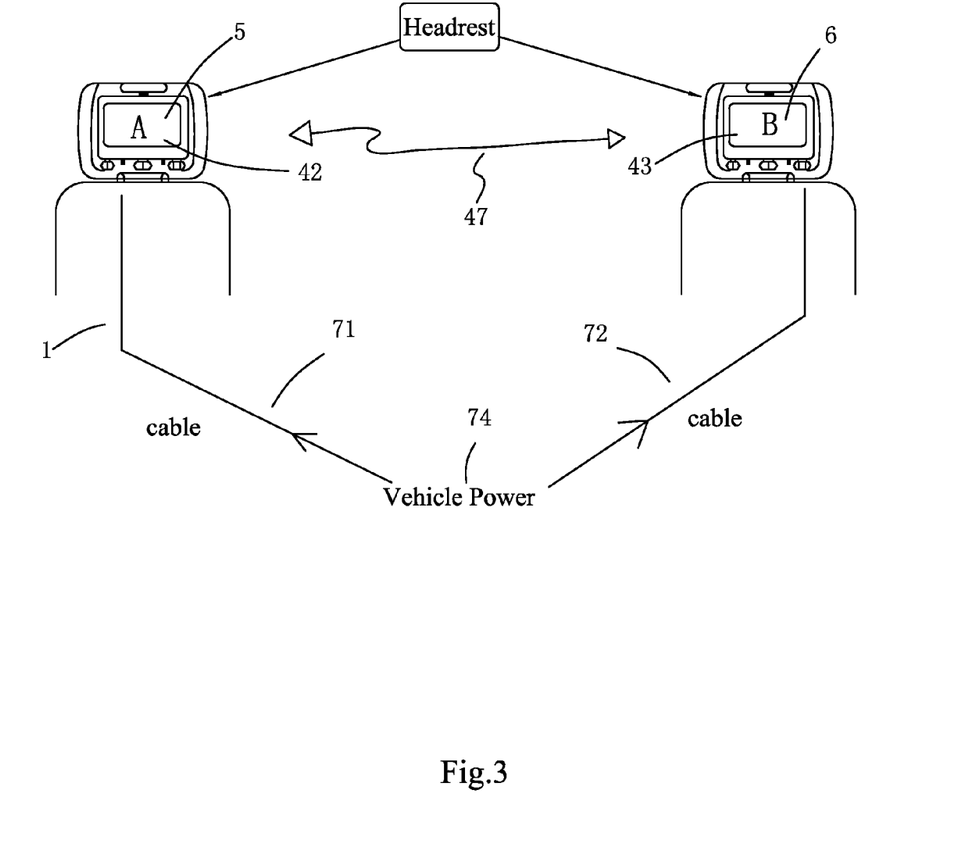
FIG. 3 shows the system configuration with two display units, their connection to each other and the power connection to the vehicle power

FIG. 3 shows another embodiment of the invention. The system 1 in FIG. 3 comprises first display device 5 and second display device 6; first monitor 42, second monitor 43, power cables 71, 72 and vehicle power 74. First display device 5 and second display device 6 are connected via wireless connection 47. The wireless connection can be changed to wired connection if so desired. System 1 may have a single headrest or multiple headrests. System 1 may have a single first display device 5 or multiple display devices namely, first display device 5 and second display device 6. Two display devices namely first display device 5 and second display device 6 shown in this embodiment. However there is no limit as to how many display devices can be used in system 1. Vehicle power 74 is connected to first display device 5 via cable 71. Vehicle power 74 is connected to second display device 6 via cable 72.

Figure 4:
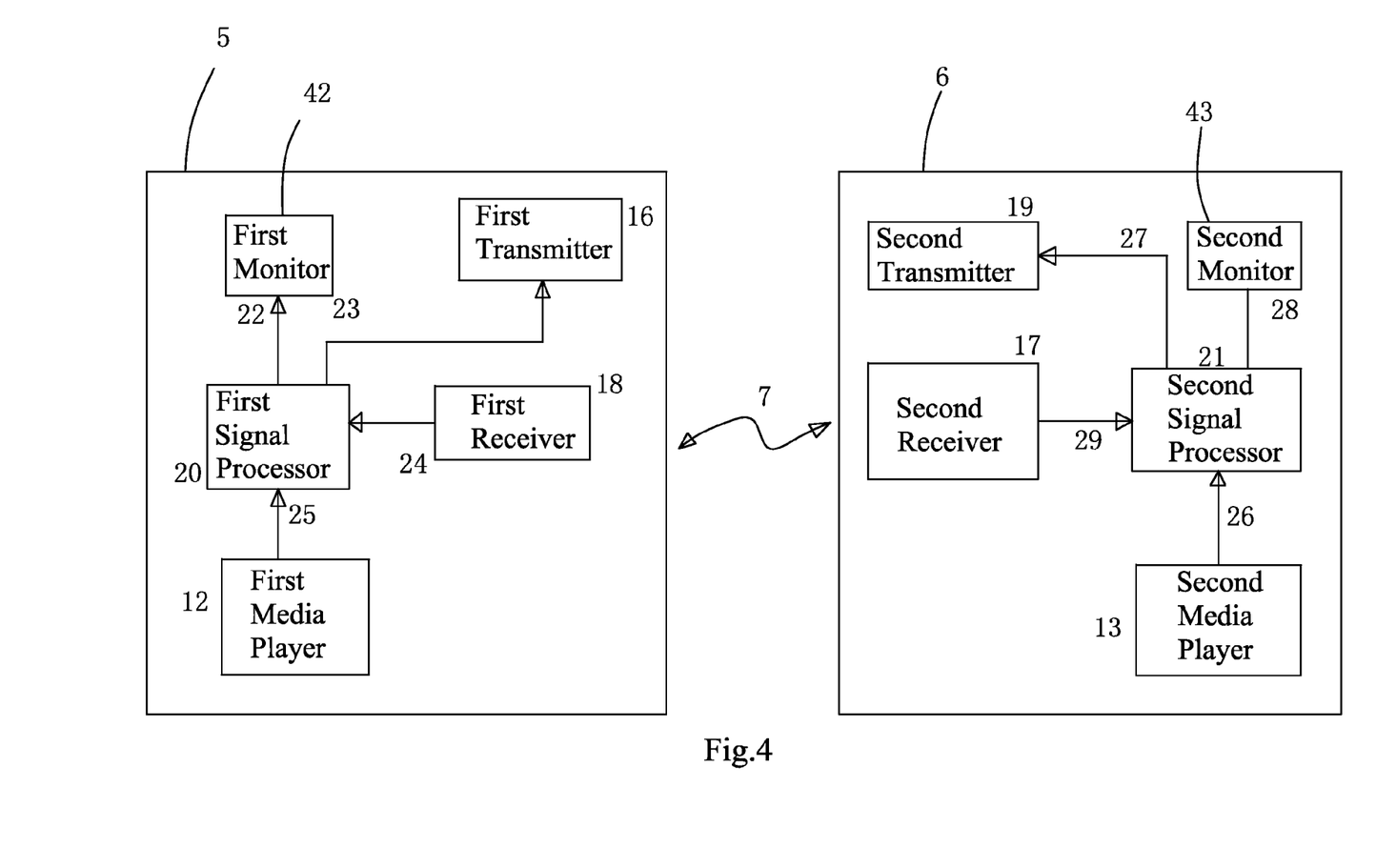
FIG. 4 shows the internal structure of the first display device and the second display device.

FIG. 4 shows the details of first display device 5 and second display device 6. First display device 5 comprises first media player 12, first signal processor 20, first transmitter 16 and first receiver 18. First media player 12 is connected to first signal processor by connection 25. First signal processor 20 is shown as a separate unit however it can be placed in first media player 12. First signal processor 20 performs signal processing function and sends the video and audio signals to first monitor 42. First signal processor 20 sends the processed signal to first transmitter 16 via link 23. First transmitter 16 transmits the signal coming from first signal processor 20. When second display device 6 is transmitting audio and video signals coming from second media player 13, first receiver 18 receives audio and video signals and after decoding audio and video signals, these signals are sent to first signal processor 20 using link 24. Once first signal processor 20 processes signal 24, output signal 22 is sent to first monitor 42 to be displayed on first monitor 42.

In FIG. 4 second display device 6 comprises second media player 13, second signal processor 21, second transmitter 19 and second receiver 17. Second media player 13 is connected to second signal processor 21 by connection 26. Second signal processor 21 is shown as a separate unit however it can be placed in second media player 13. Second signal processor 21 performs signal processing function and sends the video and audio signals to second monitor 43. Second signal processor 21 sends the processed signal to second transmitter 19 via link 27. Second transmitter 19 transmits the signal coming from second signal processor 21. When first display device 5 is transmitting audio and video signals coming from media player 12, second receiver 17 receives audio and video signals and after decoding audio and video signals, these signals are sent to second signal processor 21 using link 29. Once signal processor 21 processes signal 29, output signal 28 is sent to second monitor 43 to be displayed on second monitor 43.

Figure 5:
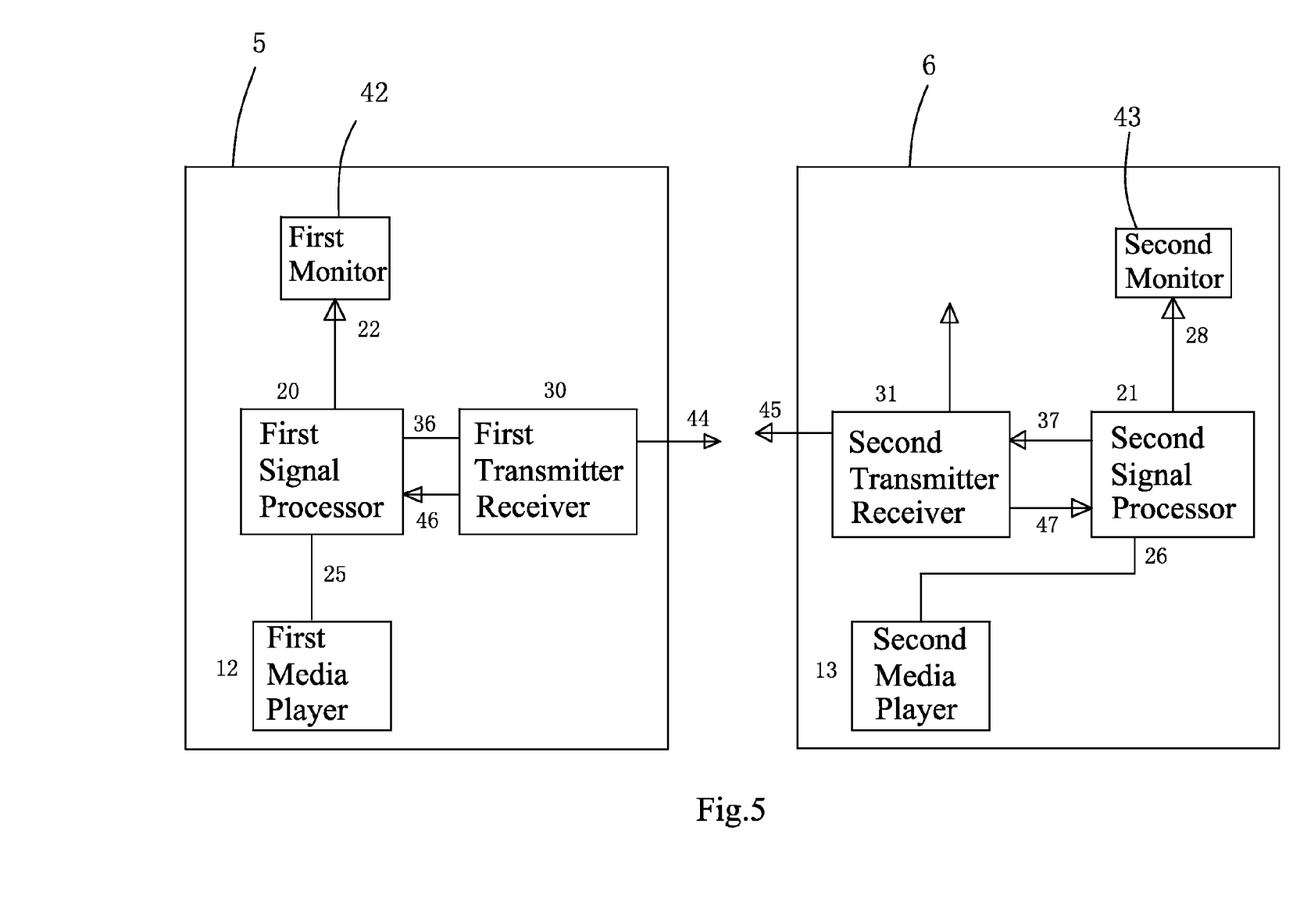
FIG. 5 shows another embodiment of the internal structure of the first display device and the second display device.

FIG. 5 shows another embodiment of the invention. In this embodiment, first transmitter 16 and first receiver 18 in FIG. 4 are combined into first combined transmitter/receiver 30. Likewise second transmitter 19 and second receiver 17 are combined into second combined transmitter/receiver 31. When the media is inserted into first media player 12, it is played and the resulting audio and video signals 25 are sent to first signal processor 20. First signal processor 20 processes audio and video signals and sends signal 22 to be displayed on first monitor 42. Signal 36 is applied to first combined transmitter/receiver 30. First combined transmitter/receiver 30 transmits signal 44 into air. When second combined transmitter/receiver 31 in second display device 6 sends signal 45 into air, this signal is received by the first combined transmitter/receiver 30. First combined transmitter/receiver 30 processes signal 45 and produces signal 46 which is applied to first signal processor 20. First signal processor 20 processes signal 46 to produce audio and video signals 22 which are sent to first monitor 42.

When the media is inserted into second media player 13, it is played and the resulting audio and video signals 26 are sent to second signal processor 21. Second signal processor 21 processes audio and video signals and sends signal 28 to be displayed on second monitor 43. Signal 37 is applied to second combined transmitter/receiver 31. Second combined transmitter/receiver 31 transmits signal 45 into air. When first combined transmitter/receiver 30 in first display device 5 sends signal 44 into air, this signal is received by the second combined transmitter/receiver 31. Second combined transmitter/receiver 31 processes signal 44 and produces signal 47 that is applied to second signal processor 21. Second signal processor 21 processes signal 47 to produce audio and video signals 28 that are sent to second monitor 43.

Figure 6:
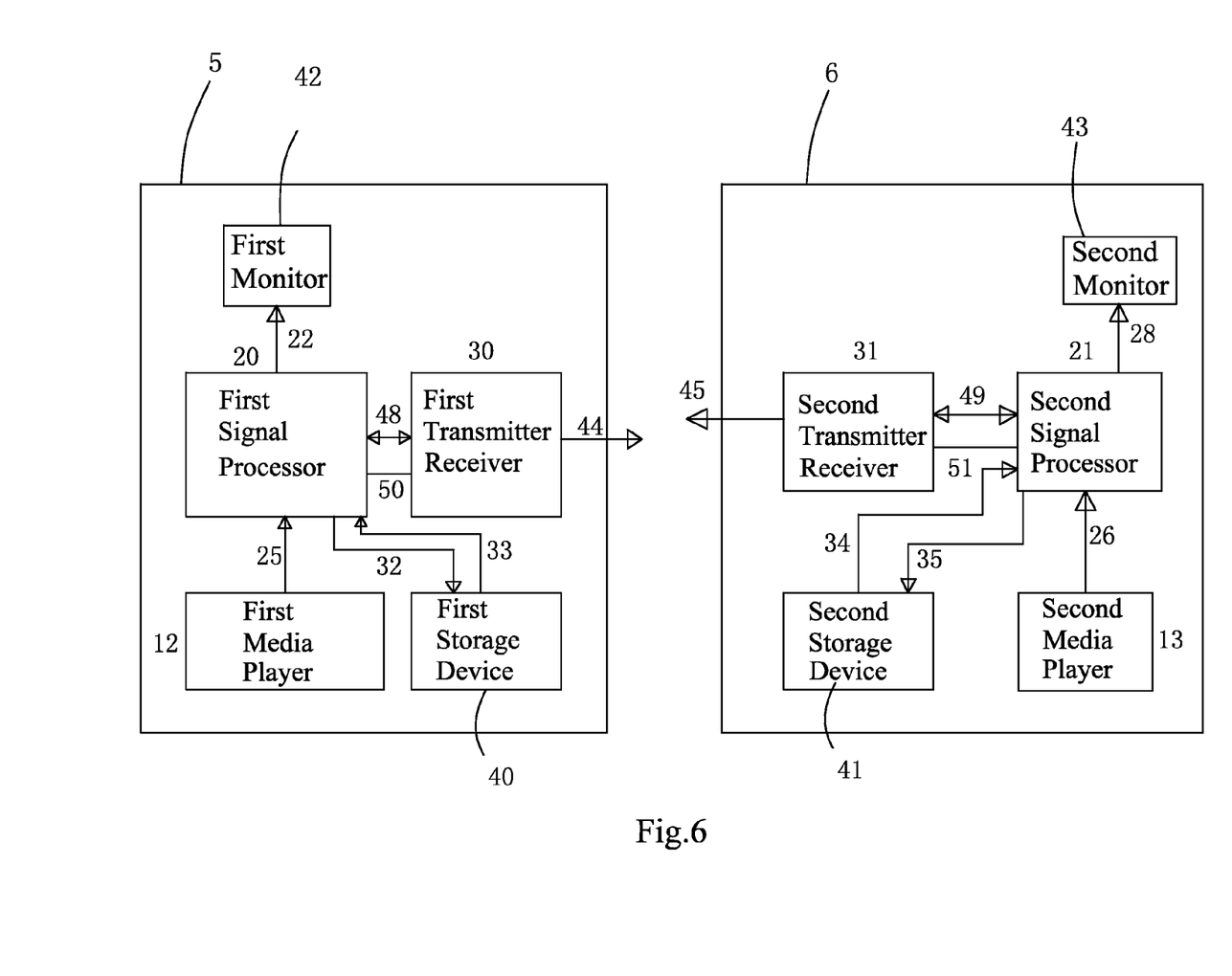
FIG. 6 shows another embodiment of the internal structure of the first display device and the second display device.

FIG. 6 shows another embodiment of the invention wherein first storage unit 40 is placed in first display device 5 and second storage unit 41 is placed in second display device 6. First storage unit 40 is connected to first signal processor 20 via links 32 and 33. First storage unit 40 stores media information either in an un-compressed format or in a compressed format. If video and audio signals to be stored in first storage unit 40 are stored in compressed format, the compression is performed by first processor 20. When signal 45 or another signal coming from another source intercepted by first combined transmitter/receiver 30, signal 45 is processed by first combined transmitter/receiver 30. The resulting signal 48 is applied to first signal processor 20. First signal processor 20 processes signal 48 to generate signal 22, which is sent to first monitor 42. If a user issues a command such that processed audio and video signals should be stored in first storage device 40 without any data compression then first signal processor 20 processes incoming signal 48 and sends the resulting audio and video signals 32 to first storage unit 40. First storage unit 40 stores incoming signal 32. First storage unit 40 may have a connector such that another storage unit can be plugged into. The external storage unit may have a video or audio in it. The content of the external storage unit is played if the user issues the command to play the media in the external storage unit. The content in the external storage unit can be stored in first storage unit 40 if the user wishes to do so.

Second storage unit 41 is connected to second signal processor 21 via link 34 and 35. Second storage unit 41 stores media information either in an un-compressed format or in a compressed format. If video and audio signals to be stored in second storage unit 41 are stored in compressed format, the compression is performed by second processor 21. When signal 44 or another signal coming from another source intercepted by second combined transmitter/receiver 31, signal 44 is processed by second combined transmitter/receiver 31. The resulting signal 49 is applied to second signal processor 21. Second signal processor 21 processes signal 49 to generate signal 28 which is sent to second monitor 43. If a user issues a command such that processed audio and video signals should be stored in second storage device 41 without any data compression then second signal processor 21 processes incoming signal 49 and sends the resulting audio and video signals 35 to second storage unit 41. Second storage unit 41 stores incoming signal 35. Second storage unit 41 may have a connector such that another storage unit can be plugged into. The external storage unit may have a video or audio in it. The content of the external storage unit is played if the user issues the command to play the media in the external storage unit. The content in the external storage unit can be stored in second storage unit 41 if the user wishes to do so.

If a user wants to play the media stored in first storage device 40, then the user would enter a command to first display device 5. A processor in first display device 5 will send a command to first storage device 40 to place audio and video data on signal line 33. Signal line 33 is connected to first signal processor 20. First signal processor 20 processes signal 33 and sends audio and video signals 22 to first monitor 42. At the same time if the user sends a command to first video device 5 to transmit the audio and video signal so that second video device 6 can display it on its monitor 43, then first signal processor 20 sends audio and video signal 48 to first combined transmitter/receiver 30. First combined transmitter/receiver 30 processes signal 48 and transmits signal 44. On the receiving end, second combined transmitter/receiver 31 in second video device 6 receives signal 44 and processes signal 44. Processed signal 49 is sent to second signal processor 21. Processed audio and video signal 28 is sent to second monitor 43 to be displayed on second monitor 43. If the user issues a command to store signal 49 in second storage device 41 then second signal processor 21 sends signal 35 to second storage device 41 to be stored in second storage device 41.

If a user wants to access media stored in second storage device 41 then the user would enter a command to second display device 6. A processor in second display device 6 sends a command to second storage device 41 to place audio and video data on signal line 34. Signal line 34 is connected to second signal processor 21. Second signal processor 21 processes signal 34 and sends audio and video signals 28 to second monitor 43. Signal 28 may or may not be displayed on monitor 43 depending upon what user command has been issued. At the same time if the user sends a command to second video device 6 to transmit the audio and video signal so that first video device 5 can display it on first monitor 42, then second signal processor 21 sends audio and video signal 51 to second combined transmitter/receiver 31. Second combined transmitter/receiver 31 processes signal 51 and transmits signal 45. On the receiving end, first combined transmitter/receiver 31 in first video device 5 receives signal 45 and processes signal 45. Processed signal 50 is sent to first signal processor 20. Processed audio and video signal 22 is sent to first monitor 42 to be displayed on first monitor 42. If the user issues a command to store signal 48 in first storage device 40 then first signal processor 20 sends signal 32 to first storage device 40 to be stored in first storage device 40.

In another embodiment, the data is compressed by first signal processor 20 before the data is stored in first storage device 40. Likewise, the data is compressed by second signal processor 21 before the data is stored in second storage device 41. Transmitted signal 44 and transmitted signal 45 can be either compressed or uncompressed signals. The choice of compressed or uncompressed signal is made by the user.

Figure 7:
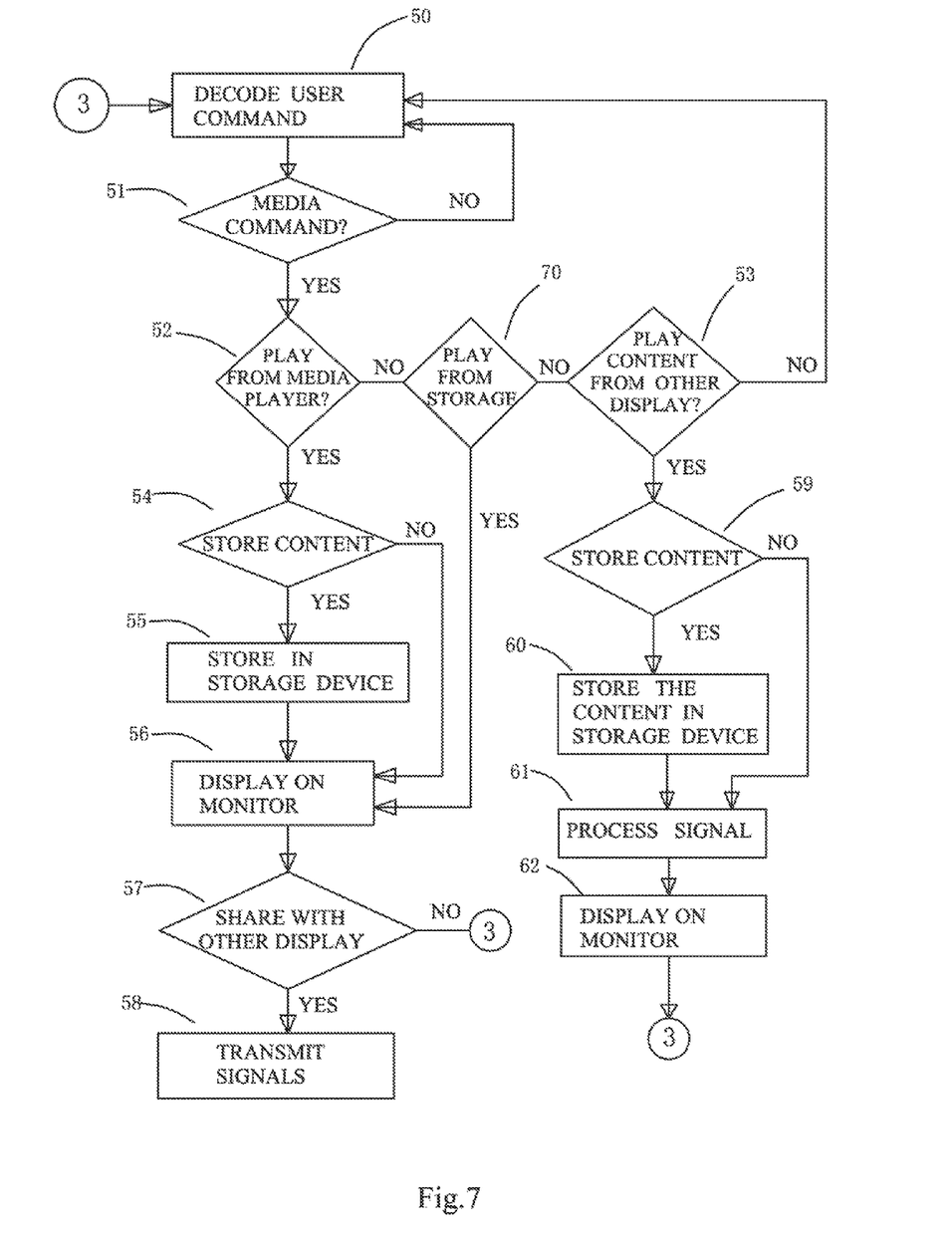
FIG. 7 shows the system flow diagram to implement user commands

The process flow of the system 1 of FIG. 1 is shown in FIG. 7. In FIG. 7 the process starts with system 1 waiting for a user's command. In step 50, a user's command is decoded. In step 51 it is checked to find out if the command is a media command. A media command is defined as a command that causes first media player 12 to play the media either inserted into first media player 12 or stored in first storage device 40. A media command may also cause second media player 13 to play the media either inserted into second media player 13 or stored in second storage device 41. If the command is not a media command then the system goes back to the beginning of the process and waits for the next user's command. If the command is a media command then the command is further checked to find out if the command requires play of media from first media player 12. In step 54, if the command requires playing media from first media player 12 then the command is further checked to find out if the user wants the media to be stored in first storage device 40. In step 55 the media content is stored in first storage unit 40. In step 56 the signal is displayed on first monitor 42. In step 54 if the user's command does not require storage of the media then the signal is sent to first monitor 42 to be displayed on first monitor 42. After displaying the signal on first monitor 42, user's command further checked in step 57 to find out if the signal should be shared with second display device 6. Although in FIG. 7 step 54 is shown before step 57, it is possible to have a system where the media is displayed on first monitor 42 and then system 1 checks to find out if the user wants to store the content in storage device 40. It is also possible that regardless when the user command is checked to find out if the user wants to store the content in first storage device 40, the user may want to store the content in first storage device 40 but yet the user does not want to play media to be displayed on first monitor 42. In that case, system 1 would store the content in first storage device 40 and then would not display the content on first monitor 42. If the signal should be shared with second display device 6 then the signal is transmitted by first transmitter 16 or first combined transmitter/receiver 30 depending upon the embodiment. If the signal in first display device 5 should not be shared with second display device 6 then system 1 gets back to the beginning step 50 and waits for the next user command. If in step 52 the user's command requires playing media not from the first display device 5 but requires playing media from second display device 6 then system 1 checks if the content from second display device 6 should be stored in first display device 5. If the user command requires media signal from second display device 6 to be stored in first display device 5 then the signal stored in first storage device 40. This is accomplished in step 60. In step 61, the signal is processed by first signal processor 20. In step 62, the signal is displayed on first monitor 42. In step 59, if it is determined by system 1 that the user does not want to store the content coming from second display device 6, then the signal from second display device 6 is processed by first signal processor 20 in step 61 and in step 62, the signal is displayed on first monitor 42. After displaying the signal on first monitor 42 in step 62, system 1 jumps back to beginning step 50 to wait for and decode the user's command.

Steps disclosed above and in FIG. 7 has been described for first display device 5. Second display device 6 follows a similar process to display media signal on second monitor 43 and transmit signal 45 to first display device 5. Likewise second display device 6 can display media signal 44 on second monitor 43 from first display device 5 after processing by signal processor 21. More specifically the steps for the second display device 6 are described below:

The process flow of the system 1 of FIG. 1 is shown in FIG. 7. In FIG. 7 the process starts with system 1 waiting for a user's command. In step 50, a user's command is decoded. In step 51 it is checked to find out if the command is a media command. If the command is not a media command then the system goes back to the beginning of the process and waits for the next user's command. If the command is a media command then the command is further checked to find out if the command requires play of media from second media player 13. If the user does not want to play from first media player 12 then in step 70, the system checks if the user wants to play from first storage device 40. Furthermore, if the command requires playing media from second media player 13 then the command is further checked to find out if the user wants the media to be stored in second storage device 41. In step 55, the content of the media is stored in second storage unit 41. In step 56 the signal is displayed on second monitor 43. In step 54 if the user's command does not require storage of the media the signal is sent to second monitor 43 to be displayed on second monitor 43. After displaying the signal on second monitor 43, user's command further checked in step 57 to find out if the signal should be shared with first display device 5. Although in FIG. 7 step 54 is shown before step 57, it is possible to have a system where the media is displayed on second monitor 43 and then system 1 checks to find out if the user wants to store the content in second storage device 41. It is also possible that regardless when the user command is checked to find out if the user wants to store the content in second storage device 41, the user may want to store the content in second storage device 41 but yet the user does not want to play media to be displayed on second monitor 43. In that case, system 1 would store the content in second storage device 41 and then would not display the content on second monitor 43. If the signal should be shared with first display device 5 then the signal is transmitted by second transmitter 19 or second combined transmitter/receiver 31 depending upon the embodiment. If the signal in second display device 6 should not be shared with first display device 5 then system 1 gets back to the beginning step 50 and waits for the next user command. If in step 52 the user's command requires playing media not from the second display device 6 but requires playing media from first display device 5 then system 1 checks if the content from first display device 5 should be stored in second display device 6. If the user command requires media signal from first display device 5 to be stored in second display device 6 then the signal stored in second storage device 41. This is accomplished in step 60. In step 61, the signal is processed by second signal processor 21. In step 62, the signal is displayed on second monitor 43. In step 59, if it is determined by system 1 that the user does not want to store the content coming from first display device 5, then the signal from first display device 5 is processed by second signal processor 21 in step 61 and in step 62, the signal is displayed on second monitor 43. After displaying the signal on second monitor 43 in step 62, system 1 jumps back to beginning step 50 to wait for and decode the user's command.

System 1 as described here can perform several functions. For example first display device 5 and second display device 6 can share the same media. The media content can be either coming from media inserted into first media player 12 or second media player 21. Alternatively media content can be coming from first storage device 40 or second storage device 41.

As an example, the user may want to insert a media into first media player 12. The user wants to watch the content in the media inserted into first media player 12. The content is shown on first monitor 42. At the same time the user may issue a command to share the content of the media inserted in first media player 12 with second display device 6. In which case, the content is sent to second display device 6 and displayed on second monitor 43. The user can also request first display device 42 to store the content of the media in first storage device 40. The user may also request to store the content of the media in second storage device 41. The user may also issue a command to store the content of the media in an external storage. The user has also the option of playing the media from the external storage device.

As another example, the user may want to insert a media into second media player 13. The user wants to watch the content in the media inserted into second media player 13. The content is shown on second monitor 43. At the same time the user may issue a command to share the content of the media inserted in second media player 13 with first display device 5. In which case, the content is sent to first display device 5 and displayed on first monitor 42. The user may also request second display device 6 to store the content of the media in second storage device 41. The user may also request to store the content of the media in first storage device 40. The user may also issue a command to store the content of the media in an external storage. The user has also the option of playing the media from the external storage device.

Although embodiments discussed so far show that system 1 being installed in a vehicle, system 1 can be placed in any other environment such as home, office, public places, restaurant, coffee shop and other places. When placed in a different place, system 1 works as described in previous embodiments.

Figure 8:
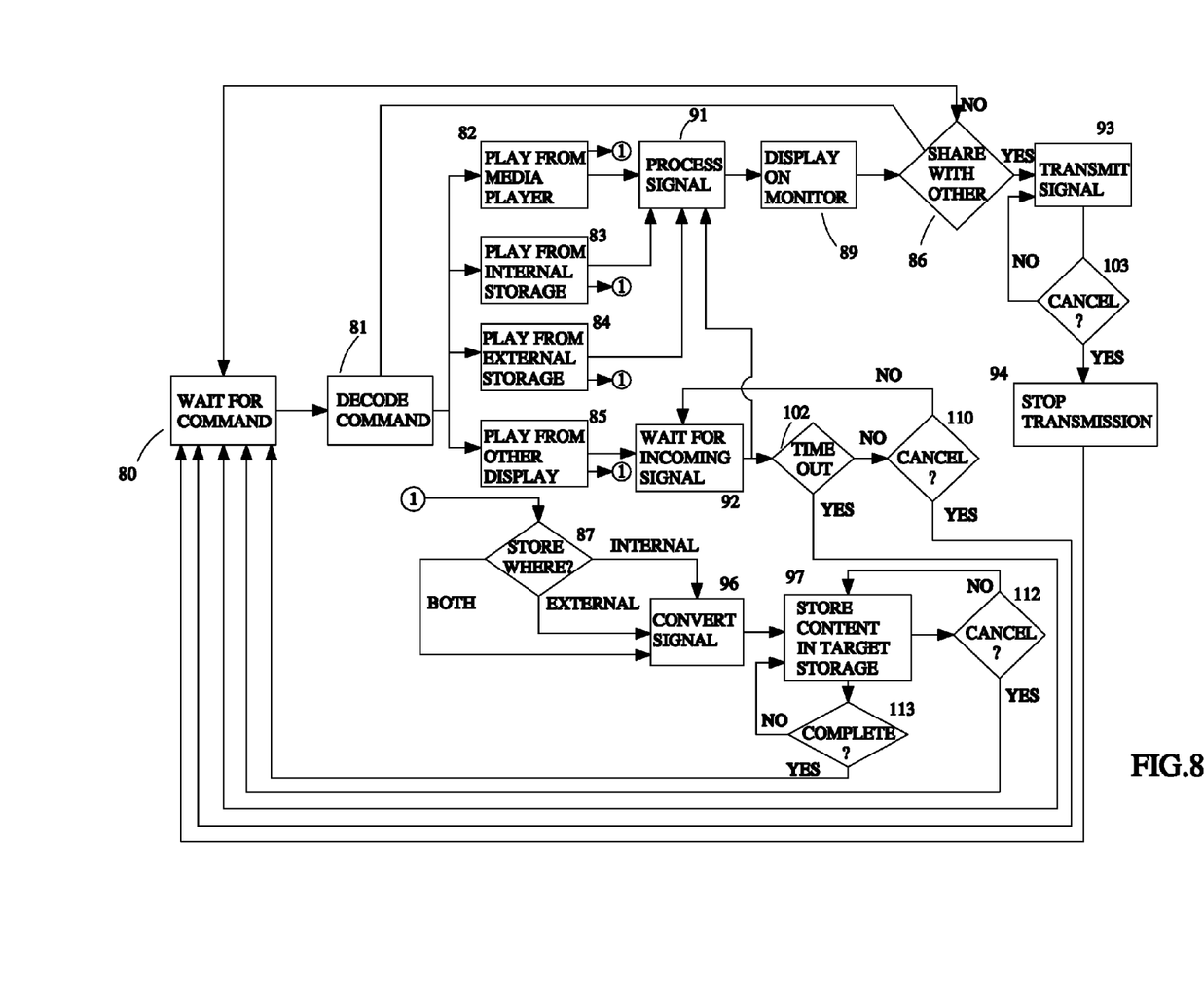
FIG. 8 shows another system flow diagram to implement user commands

FIG. 8 shows another embodiment of the invention. In FIG. 8, in step 80 system 1 waits for the user command. In step 81, the user command is decoded. Once the user command is decoded, one of the several actions can take place based on what the user command is. These steps are step 82 to play video from first media player 12 or step 83 to play video from first internal storage 40 or step 84 to play media from an external storage device or step 85 to play media from second display device 6.

Only one of the steps 82, 83, 84, or 85 can be implemented at a time. Step 87 is the step to check where the user wants to store the media content. If the user command requires play from first media player 12 then in step 91 the signal is processed and then in step 89 media content is displayed on first monitor 42. After the display operation, system 1 checks if the user wants to share the content with another display device. This is accomplished in step 86. If the user wants to share the content with another display device then the media content is transmitted in step 93. In step 103 system 1 checks if the user wants to cancel the transmission. If the user wants to cancel the transmission then system 1 stops transmission in step 94 and returns to step 80 to wait for the next user command. If the user does not want to cancel the transmission in step 103 then system 1 continues to transmit signal in step 93. In step 86 if the user does not want to share the content with another display device then system 1 returns to step 80 to wait for the next user command. Step 86 is available as a command during the media playback. For example the user may want to start sharing the media content with another display in the middle of the media playback, and the system will act accordingly.

If the user wants to play media from first storage device 40, then in step 91 the signal is processed in first signal processor 20 and then in step 89 the media is displayed on first monitor 42. After the display operation, system 1 checks if the user wants to share the content with another display device. This is accomplished in step 86. If the user wants to share the content with another display device then the media content is transmitted in step 93. In step 103 system 1 checks if the user wants to cancel the transmission. If the user wants to cancel the transmission then system 1 stops transmission in step 94 and returns to step 80 to wait for the next user command. If the user does not want to cancel the transmission in step 103 then system 1 continues to transmit signal in step 93. In step 86 if the user does not want to share the content with another display device then system 1 returns to step 80 to wait for the next user command.

If the user command requires play from an external device in step 84, then system 1 progresses to step 91 from step 84 wherein the signal is processed by first signal processor 20. Then the signal is sent to first monitor 42 to be displayed. After the display operation, system 1 checks if the user wants to share the content with another display device. This is accomplished in step 86. If the user wants to share the content with another display device then the media content is transmitted in step 93. In step 103 system 1 checks if the user wants to cancel the transmission. If the user wants to cancel the transmission then system 1 stops transmission in step 94 and returns to step 80 to wait for the next user command. If the user does not want to cancel the transmission in step 103 then system 1 continues to transmit signal in step 93. In step 86 if the user does not want to share the content with another display device then system 1 returns to step 80 to wait for the next user command.

In step 85 if the user command requires play from second display device 6, then system 1 progresses to step 92 from step 85 wherein first video device 5 waits for incoming audio and video signals. Once the signals are received from second video device 6 by first video device 5, system 1 moves to step 91 to process the signal then to step 89 where the media is displayed on first monitor 42. After the display operation, system 1 checks if the user wants to share the content with another display device. This is accomplished in step 86. If the user wants to share the content with another display device then the media content is transmitted in step 93. In step 103 system 1 checks if the user wants to cancel the transmission. If the user wants to cancel the transmission then system 1 stops transmission in step 94 and returns to step 80 to wait for the next user command. If the user does not want to cancel the transmission in step 103 then system 1 continues to transmit signal in step 93. In step 86 if the user does not want to share the content with another display device then system 1 returns to step 80 to wait for the next user command. System 1 also checks if there is a time out in step 102. In step 110 system 1 checks to see if the user cancels the operation.

The user command further checked in step 87 to find out if the user requires storing the played media in the first storage device or in an external storage device or in both. If the user wants to store in the first storage device then in step 96, media signal is converted to a storable format then the signal is stored in first storage device 40 in step 97. In step 113 system 1 checks to see if the storage operation is complete. If it is complete then system 1 goes back to step 80 to wait for the next user command. If the user wants to store in an external storage device then in step 96, media signal is converted to a storable format then the signal is stored in first storage device 40 in step 97. In step 113 system 1 checks to see if the storage operation is complete. If it is complete then system 1 goes back to step 80 to wait for the next user command. If the user wants to store in both the first storage device and an external storage device then in step 96, media signal is converted to a storable format then the signal is stored in first storage device 40 in step 97. In step 113 system 1 checks to see if the storage operation is complete. If it is complete then system 1 goes back to step 80 to wait for the next user command. Note step 87 is available as a command at any time during the media playback. For example, the user may choose to start storing the content in the middle of a video, and the user may end the storing before the video ends. In this scenario the system will store only the content defined by the user.

First storage device 40 and second storage device 41 can be flash, ROM, EMMC, hard drive or any other suitable internal storage device.

External storage device can be USB drive, SD card, USB hard drive or any other suitable storage device.

Media signal is transmitted wirelessly or wired. Transfer protocols such as Real-time Transport Protocol (RTP), Digital Living Network Alliance (DLNA), Universal Plug and Play (UPnP), or any other suitable protocol is used.

FIG. 8 shows the general flow of the process used in either first display device 5 or second display device 6. Previous paragraph discussed the details of the process for first display device 5. However the same flow applies to second display device 6.

Embodiments discussed above disclose a vehicle entertainment system wherein the monitors are placed in multiple vehicle seat headrests. However the system and methods disclosed also apply to all vehicle entertainment systems. For example in one embodiment system 1 may have gooseneck monitors meaning monitors are attached to headrest but not placed in the headrest. In another embodiment system 1 may have overhead monitors meaning monitors are attached to vehicle ceiling. In yet another embodiment, monitors are placed in multiple vehicle seatbacks. In yet another embodiment, a monitor is placed in vehicle head unit compartment.

While these embodiments discuss system 1 as being used in a vehicle, it should be understood that system 1 and the method disclosed here used in any set up. For example system 1 can be a system used at home. In another example system 1 can be a system used in an office.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A video entertainment system comprising:
   a first monitor;
   a first media player;
   a first signal processor;
   a first transmitter;
   a first receiver;
   a first storage device;
   a second monitor;
   a second media player;
   a second signal processor;
   a second transmitter;
   a second receiver;
   a second storage device;
   wherein audio and video signals from the first media player are connected to the first signal processor and the first signal processor is capable of processing audio and video signals and performing compression of audio and video signals to be stored in the first storage device and the first signal processor is directly connected to the first transmitter, to the first receiver, to the first monitor, and to the first storage device;
   wherein audio and video signals from the second media player are connected to the second signal processor and the second signal processor is capable of processing audio and video signals and performing compression of audio and video signals to be stored in the second storage device and the second signal processor is directly connected to the second transmitter, to the second receiver, to the second monitor, and to the second storage device;
   wherein the first transmitter is capable of sending signals coming from the first signal processor to the second receiver and the second receiver is capable of receiving signals sent by the first transmitter;
   wherein the second transmitter is capable of sending signals coming from the second signal processor to the first receiver and the first receiver is capable of receiving signals sent by the second transmitter; and
   wherein the video entertainment system comprises no central box for distributing audio and video signals;
   playing media content in the video entertainment system, comprising the following steps wherein the steps are performed in the order given below:
   decoding a user's command;
   accessing the media content from a source selected from a group consisting of the first media player, a first internal storage device and a first external storage device;
   processing signal and decompressing the media content if the media content was compressed when the media content was stored in the first internal storage or in the first external storage;
   displaying the media content on the first monitor;
   transmitting signal to the second monitor if the user wants to share the media content with the second monitor; and
   stopping transmission of the media content from the first monitor to the second monitor if the user wants to stop transmission of the media content;
   returning to the step of decoding a user's command for waiting for the user's command if transmission of media content is stopped;
   wherein the command is further checked to determine if the user wants to store the content in the first internal storage device, the first external storage device, or in both the first internal storage device and the first external storage device;
   further checked to determine if the user wants to store the content in a second internal storage device, a second external storage device, or in both the second internal storage device and the second external storage device;
   converting the media content to a storable format;
   storing the media content either in the first internal storage device or in the first external storage device or both in the first internal storage device and in the first external storage device depending upon the user command;
   storing the media content either in the second internal storage device or in the second external storage device or both in the second internal storage device and in the second external storage device depending upon the user command; and
   returning to the step that checks if the user wants to store the content in the first internal storage device, the first external storage device, or in both the first internal storage device and the first external storage device;
waiting for the next user command if the storage process is completed or if the user cancels the storage operation.

2. A method of playing a media content in the video entertainment system of claim 1, the method comprising the following steps wherein the steps are performed in the order given below:
decoding a user's command;
accessing the media content which is located in the second media player, the second internal storage device or in the second external storage device;
processing signal and decompressing the media content if the media content was compressed when the media content was stored in the second internal storage or in the second external storage;
displaying the media content on the second monitor;
transmitting signal to the first monitor if the user wants to share the media content with the first monitor; and
stopping the transmission of the media content from the second monitor to the first monitor if the user wants to stop the transmission of the media content.

3. A method of playing a media content in the video entertainment system of claim 1, the method comprising the following steps wherein the steps are performed in the order given below:
decoding a user's command;
waiting for an incoming signal;
processing the incoming signal from the first media player if the user selects the first media player as a source of the media content and decompressing the incoming signal if the incoming signal is coming from the first internal storage unit or from the first external storage unit;
displaying the media content on the first monitor;
transmitting signal to the second monitor if the user wants to share the content with the second monitor;
stopping the transmission if the user wants to stop;
returning to the step for decoding a user's command if the user wants to stop displaying the media content on the first monitor; and
cancelling the operation if the user wants to cancel.

4. A method of playing a media content in the video entertainment system of claim 1 the method comprising the following steps wherein the steps are performed in the order given below:
decoding a user's command;
waiting for an incoming signal;
processing the incoming signal coming from the second media player if the user selects the second media player as a source of the media content and decompressing the incoming signal if the incoming signal is coming from the second internal storage unit or from the second external storage unit;
displaying the media content on the second monitor;
transmitting signal to the first monitor if the user wants to share the content with the first monitor;
stopping the transmission of the user wants to stop;
returning to step of decoding a user's command if the user wants to stop displaying the media content on the second monitor; and
cancelling the operation if the user wants to cancel.

5. A video entertainment system comprising:
a first monitor;
a first media player:
a first signal processor:
a first transceiver;
a first storage device;
a second monitor;
a second media player;
a second signal processor;
a second transceiver;
a second storage device;
wherein audio and video signals from the first media player are connected to the first signal processor;
the first signal processor is connected to the first transceiver, to the first monitor, and to the first storage device;
wherein audio and video signals from the second media player are connected to the second signal processor;
the second signal processor is connected to the second transceiver, to the second monitor, and to the second storage device;
a power filter;
wherein the power filter is connected to a vehicle power source;
wherein the power filter is capable of filtering the vehicle power and sending filtered power to the first monitor and the second monitor;
the first monitor is connected to the power filter;
the second monitor is connected to the power filter;
wherein the first transceiver is capable of sending video and audio signals to the second transceiver and the second transceiver is capable of receiving video and audio signals sent by the first transceiver;
wherein the second transceiver is capable of sending video and audio signals to the first transceiver and the first transceiver is capable of receiving video and audio signals sent by the second transceiver;
wherein the video entertainment system comprises no central box for distributing audio and video signals;
playing media content in the video entertainment system, comprising the following steps wherein the steps are performed in the order given below:
decoding a user's command;
accessing the media content from a source selected from a group consisting of the first media player, a first internal storage device and a first external storage device;
processing signal and decompressing the media content if the media content was compressed when the media content was stored in the first internal storage or in the first external storage;
displaying the media content on the first monitor;
transmitting signal to the second monitor if the user wants to share the media content with the second monitor; and
stopping transmission of the media content from the first monitor to the second monitor if the user wants to stop transmission of the media content;
returning to the step of decoding a user's command for waiting for the user's command if transmission of media content is stopped;
wherein the command is further checked to determine if the user wants to store the content in the first internal storage device, the first external storage device, or in both the first internal storage device and the first external storage device;
further checked to determine if the user wants to store the content in a second internal storage device, a second external storage device, or in both the second internal storage device and the second external storage device;
converting the media content to a storable format;
storing the media content either in the first internal storage device or in the first external storage device or both in the first internal storage device and in the first external storage device depending upon the user command;

storing the media content either in the second internal storage device or in the second external storage device or both in the second internal storage device and in the second external storage device depending upon the user command; and returning to the step that checks if the user wants to store the content in the first internal storage device, the first external storage device, or in both the first internal storage device and the first external storage device;

waiting for the next user command if the storage process is completed or if the user cancels the storage operation.

6. A video entertainment system comprising:
a first monitor;
a first media player:
a first signal processor:
a first transmitter;
a first receiver;
a first storage device;
a second monitor;
a second media player;
a second signal processor;
a second transmitter;
a second receiver;
a second storage device;
wherein audio and video signals from the first media player are connected to the first signal processor;
the first signal processor is connected to the first transmitter, to the first receiver, to the first monitor, and to the first storage device;
wherein audio and video signals from the second media player are connected to the second signal processor;
the second signal processor is connected to the second transmitter, to the second receiver, to the second monitor, and to the second storage device;
the first monitor is directly connected to a vehicle power source;
the second monitor is directly connected to the vehicle power source;
wherein the first transmitter is capable of sending video and audio signals to the second receiver and the second receiver is capable of receiving video and audio signals sent by the first transmitter;
wherein the second transmitter is capable of sending video and audio signals to the first receiver and the first receiver is capable of receiving video and audio signals sent by the second transmitter; and
wherein the video entertainment system comprises no central box for distributing audio and video signals;
playing media content in the video entertainment system, comprising the following steps wherein the steps are performed in the order given below:
decoding a user's command;
accessing the media content from a source selected from a group consisting of the first media player, a first internal storage device and a first external storage device;
processing signal and decompressing the media content if the media content was compressed when the media content was stored in the first internal storage or in the first external storage;
displaying the media content on the first monitor;
transmitting signal to the second monitor if the user wants to share the media content with the second monitor; and
stopping transmission of the media content from the first monitor to the second monitor if the user wants to stop transmission of the media content;

returning to the step of decoding a user's command for waiting for the user's command if transmission of media content is stopped;

wherein the command is further checked to determine if the user wants to store the content in the first internal storage device, the first external storage device, or in both the first internal storage device and the first external storage device;

further checked to determine if the user wants to store the content in a second internal storage device, a second external storage device, or in both the second internal storage device and the second external storage device;

converting the media content to a storable format;

storing the media content either in the first internal storage device or in the first external storage device or both in the first internal storage device and in the first external storage device depending upon the user command;

storing the media content either in the second internal storage device or in the second external storage device or both in the second internal storage device and in the second external storage device depending upon the user command; and returning to the step that checks if the user wants to store the content in the first internal storage device, the first external storage device, or in both the first internal storage device and the first external storage device;

waiting for the next user command if the storage process is completed or if the user cancels the storage operation.

7. A method of playing a media content in the video entertainment system of claim 6, the method comprising the following steps wherein the steps are performed in the order given below:
decoding a user's command;
playing the media content from a group consisting of the second media player, the second internal storage device and the second external storage device; and
sharing the media content of the second monitor with the first monitor if the user wants to share the content with the first monitor.

8. A video entertainment system comprising:
a first monitor;
a first media player:
a first signal processor:
a first transmitter;
a first receiver;
a second monitor;
a second media player;
a second signal processor;
a second transmitter;
a second receiver;
wherein audio and video signals from the first media player are connected to the first signal processor and the first signal processor is capable of processing audio and video signals and the first signal processor is directly connected to the first transmitter, to the first receiver, to the first monitor;
wherein audio and video signals from the second media player are connected to the second signal processor and the second signal processor is capable of processing audio and video signals and the second signal processor is directly connected to the second transmitter, to the second receiver, to the second monitor;
wherein the first transmitter is capable of sending signals coming from the first signal processor to the second receiver and the second receiver is capable of receiving signals sent by the first transmitter;

wherein the second transmitter is capable of sending signals coming from the second signal processor to the first receiver and the first receiver is capable of receiving signals sent by the second transmitter; and wherein the video entertainment system comprises no central box for distributing audio and video signals;

playing media content in the video entertainment system, comprising the following steps wherein the steps are performed in the order given below:

decoding a user's command;

accessing the media content from a source selected from a group consisting of the first media player, a first internal storage device and a first external storage device;

processing signal and decompressing the media content if the media content was compressed when the media content was stored in the first internal storage or in the first external storage;

displaying the media content on the first monitor;

transmitting signal to the second monitor if the user wants to share the media content with the second monitor; and stopping transmission of the media content from the first monitor to the second monitor if the user wants to stop transmission of the media content;

returning to the step of decoding a user's command for waiting for the user's command if transmission of media content is stopped;

wherein the command is further checked to determine if the user wants to store the content in the first internal storage device, the first external storage device, or in both the first internal storage device and the first external storage device;

further checked to determine if the user wants to store the content in a second internal storage device, a second external storage device, or in both the second internal storage device and the second external storage device;

converting the media content to a storable format;

storing the media content either in the first internal storage device or in the first external storage device or both in the first internal storage device and in the first external storage device depending upon the user command;

storing the media content either in the second internal storage device or in the second external storage device or both in the second internal storage device and in the second external storage device depending upon the user command; and returning to the step that checks if the user wants to store the content in the first internal storage device, the first external storage device, or in both the first internal storage device and the first external storage device;

waiting for the next user command if the storage process is completed or if the user cancels the storage operation.

9. A method of playing a media content in the video entertainment system of claim 8, the method comprising the following steps wherein the steps are performed in the order given below:

decoding a user's command;

accessing the media content in the second media player;

processing signal;

displaying the media content on the second monitor;

transmitting signal to the first monitor if the user wants to share the media content with the first monitor; and stopping the transmission of the media content from the second monitor to the first monitor if the user wants to stop the transmission of the media content.

10. A method of playing a media content in the video entertainment system of claim 8, the method comprising the following steps wherein the steps are performed in the order given below:

decoding a user's command;

waiting for an incoming signal;

processing the incoming signal coming from the second media player;

displaying the media content on the second monitor;

transmitting signal to the first monitor if the user wants to share the content with the first monitor;

returning to the step of decoding a user's command for waiting for the user's command if the user wants to cancel.

11. A video entertainment system comprising:

a first monitor;

a first media player:

a first signal processor:

a first transceiver;

a second monitor;

a second media player;

a second signal processor;

a second transceiver;

wherein audio and video signals from the first media player are connected to the first signal processor;

the first signal processor is connected to the first transceiver, to the first monitor; wherein audio and video signals from the second media player are connected to the second signal processor;

the second signal processor is connected to the second transceiver, to the second monitor;

a power filter;

wherein the power filter is connected to a vehicle power source;

wherein the power filter is capable of filtering the vehicle power and sending filtered power to the first monitor and the second monitor;

the first monitor is connected to the power filter;

the second monitor is connected to the power filter;

wherein the first transceiver is capable of sending video and audio signals to the second transceiver and the second transceiver is capable of receiving video and audio signals sent by the first transceiver;

wherein the second transceiver is capable of sending video and audio signals to the first transceiver and the first transceiver is capable of receiving video and audio signals sent by the second transceiver; and wherein the video entertainment system comprises no central box for distributing audio and video signals;

playing media content in the video entertainment system, comprising the following steps wherein the steps are performed in the order given below:

decoding a user's command;

accessing the media content from a source selected from a group consisting of the first media player, a first internal storage device and a first external storage device;

processing signal and decompressing the media content if the media content was compressed when the media content was stored in the first internal storage or in the first external storage;

displaying the media content on the first monitor;

transmitting signal to the second monitor if the user wants to share the media content with the second monitor; and stopping transmission of the media content from the first monitor to the second monitor if the user wants to stop transmission of the media content;

returning to the step of decoding a user's command for waiting for the user's command if transmission of media content is stopped;

wherein the command is further checked to determine if the user wants to store the content in the first internal storage device, the first external storage device, or in both the first internal storage device and the first external storage device;

further checked to determine if the user wants to store the content in a second internal storage device, a second external storage device, or in both the second internal storage device and the second external storage device;

converting the media content to a storable format;

storing the media content either in the first internal storage device or in the first external storage device or both in the first internal storage device and in the first external storage device depending upon the user command;

storing the media content either in the second internal storage device or in the second external storage device or both in the second internal storage device and in the second external storage device depending upon the user command; and returning to the step that checks if the user wants to store the content in the first internal storage device, the first external storage device, or in both the first internal storage device and the first external storage device;

waiting for the next user command if the storage process is completed or if the user cancels the storage operation.

12. A video entertainment system comprising:
a first monitor;
a first media player:
a first signal processor:
a first transmitter;
a first receiver;
a second monitor;
a second media player;
a second signal processor;
a second transmitter;
a second receiver;
wherein audio and video signals from the first media player are connected to the first signal processor;
the first signal processor is connected to the first transmitter, to the first receiver, to the first monitor;
wherein audio and video signals from the second media player are connected to the second signal processor;
the second signal processor is connected to the second transmitter, to the second receiver, to the second monitor;
the first monitor is directly connected to a vehicle power source;
the second monitor is directly connected to the vehicle power source;
wherein the first transmitter is capable of sending video and audio signals to the second receiver and the second receiver is capable of receiving video and audio signals sent by the first transmitter;
wherein the second transmitter is capable of sending video and audio signals to the first receiver and the first receiver is capable of receiving video and audio signals sent by the second transmitter; and wherein the video entertainment system comprises no central box for distributing audio and video signals;

playing media content in the video entertainment system, comprising the following steps wherein the steps are performed in the order given below:

decoding a user's command;

accessing the media content from a source selected from a group consisting of the first media player, a first internal storage device and a first external storage device;

processing signal and decompressing the media content if the media content was compressed when the media content was stored in the first internal storage or in the first external storage;

displaying the media content on the first monitor;

transmitting signal to the second monitor if the user wants to share the media content with the second monitor; and stopping transmission of the media content from the first monitor to the second monitor if the user wants to stop transmission of the media content;

returning to the step of decoding a user's command for waiting for the user's command if transmission of media content is stopped;

wherein the command is further checked to determine if the user wants to store the content in the first internal storage device, the first external storage device, or in both the first internal storage device and the first external storage device;

further checked to determine if the user wants to store the content in a second internal storage device, a second external storage device, or in both the second internal storage device and the second external storage device;

converting the media content to a storable format;

storing the media content either in the first internal storage device or in the first external storage device or both in the first internal storage device and in the first external storage device depending upon the user command;

storing the media content either in the second internal storage device or in the second external storage device or both in the second internal storage device and in the second external storage device depending upon the user command; and returning to the step that checks if the user wants to store the content in the first internal storage device, the first external storage device, or in both the first internal storage device and the first external storage device;

waiting for the next user command if the storage process is completed or if the user cancels the storage operation.

13. A method of playing a media content in the video entertainment system of claim 12, the method comprising the following steps wherein the steps are performed in the order given below:

decoding a user's command;

playing the media content from the second media player; and sharing the media content of the second monitor with the first monitor if the user wants to share the content with the first monitor.

* * * * *